United States Patent
Imai

(10) Patent No.: US 9,482,982 B2
(45) Date of Patent: Nov. 1, 2016

(54) IMAGING SYSTEM, PRINT HEAD, IMAGE FORMING APPARATUS, AND IMAGE SCANNER

(71) Applicant: Shigeaki Imai, Kanagawa (JP)

(72) Inventor: Shigeaki Imai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 306 days.

(21) Appl. No.: 13/926,209

(22) Filed: Jun. 25, 2013

(65) Prior Publication Data

US 2014/0022327 A1 Jan. 23, 2014

(30) Foreign Application Priority Data

Jul. 20, 2012 (JP) .................................. 2012-161098

(51) Int. Cl.
| | | |
|---|---|---|
| *G03G 15/04* | (2006.01) | |
| *G02B 3/00* | (2006.01) | |
| *G03G 15/043* | (2006.01) | |
| *G02B 27/00* | (2006.01) | |

(52) U.S. Cl.
CPC .............. *G03G 15/04* (2013.01); *G02B 3/005* (2013.01); *G02B 3/0037* (2013.01); *G02B 3/0068* (2013.01); *G02B 27/0018* (2013.01); *G03G 15/0435* (2013.01); *G03G 15/04054* (2013.01)

(58) Field of Classification Search
CPC ......... G02B 26/10; G02B 26/08; B41J 2/385
USPC ................ 359/210.1, 210.2, 204.1, 831–837
See application file for complete search history.

(56) References Cited

U.S. PATENT DOCUMENTS

| | | | | |
|---|---|---|---|---|
| 3,825,856 A | * | 7/1974 | Pezot ........................ | H01S 3/08 359/739 |
| 2003/0007067 A1 | * | 1/2003 | Masuda ................... | B41J 2/451 347/241 |
| 2004/0165240 A1 | | 8/2004 | Suzuki et al. | |
| 2004/0240000 A1 | | 12/2004 | Miyatake et al. | |
| 2005/0094234 A1 | | 5/2005 | Miyatake et al. | |
| 2005/0190420 A1 | | 9/2005 | Imai et al. | |
| 2005/0225492 A1 | * | 10/2005 | Metz ........................ | H01P 3/08 343/753 |

(Continued)

FOREIGN PATENT DOCUMENTS

| | | |
|---|---|---|
| JP | 63-225218 | 9/1988 |
| JP | 4-336559 | 11/1992 |

(Continued)

OTHER PUBLICATIONS

Japanese Office Action issued in Application No. 2012-161098 on Feb. 25, 2016.

*Primary Examiner* — Stephone B. Allen
*Assistant Examiner* — Rahman Abdur
(74) *Attorney, Agent, or Firm* — Oblon, McClelland, Maier & Neustadt, L.L.P.

(57) ABSTRACT

An imaging system includes an incidence face having a plurality of optical faces formed along a first axis with a first pitch; a prism face having a plurality of grooves formed along the first axis with a second pitch; and an exit face having a plurality of optical faces formed along the first axis with a third pitch. A virtual plane extends from an end of the one optical face of the incidence face to an end of the one optical face of the exit face. Among light flux emitting from a spot light source and entering the one optical face of the incidence face, a light beam that passes over the virtual plane is reflected at the prism face, and passes over the virtual plane again and goes to the one optical face of the exit face.

11 Claims, 15 Drawing Sheets

(56) References Cited

U.S. PATENT DOCUMENTS

| | | |
|---|---|---|
| 2006/0158711 A1 | 7/2006 | Imai et al. |
| 2007/0058255 A1 | 3/2007 | Imai et al. |
| 2007/0236557 A1 | 10/2007 | Imai et al. |
| 2008/0019255 A1 | 1/2008 | Imai et al. |
| 2008/0068678 A1 | 3/2008 | Suzuki et al. |
| 2008/0170283 A1 | 7/2008 | Imai |
| 2008/0192323 A1 | 8/2008 | Nakamura et al. |
| 2008/0259426 A1 | 10/2008 | Imai |
| 2009/0058979 A1 | 3/2009 | Saisho et al. |
| 2009/0073529 A1 | 3/2009 | Imai |
| 2009/0073531 A1 | 3/2009 | Imai |
| 2009/0074437 A1 | 3/2009 | Tanabe et al. |
| 2009/0225385 A1 | 9/2009 | Imai |
| 2009/0231654 A1 | 9/2009 | Imai |
| 2010/0310284 A1 | 12/2010 | Funato et al. |
| 2011/0102536 A1 | 5/2011 | Imai |
| 2012/0027450 A1 | 2/2012 | Imai |
| 2012/0056968 A1 | 3/2012 | Imai et al. |
| 2012/0182367 A1 | 7/2012 | Masuda et al. |

FOREIGN PATENT DOCUMENTS

| | | |
|---|---|---|
| JP | 6-250119 | 9/1994 |
| JP | 10-153751 | 6/1998 |
| JP | 11-109282 | 4/1999 |
| JP | 11-109283 | 4/1999 |
| JP | 2000-108403 | 4/2000 |
| JP | 2000-108405 | 4/2000 |
| JP | 2000-221443 | 8/2000 |
| JP | 2002-350604 | 12/2002 |
| JP | 2003-211721 | 7/2003 |

* cited by examiner

FIG. 15

| | |
|---|---|
| $R_{m0}$ | 1.32173 |
| $a_{00}$ | $-3.07705 \times 10^{-1}$ |
| $a_{01}$ | — |
| $a_{02}$ | — |
| $a_{03}$ | — |
| $a_{04}$ | $-2.53719 \times 10^{-2}$ |
| $a_{05}$ | — |
| $a_{06}$ | $-2.65673 \times 10^{-1}$ |
| $a_{07}$ | — |
| $a_{08}$ | $4.00721 \times 10^{-1}$ |
| $a_{09}$ | — |
| $a_{10}$ | $-1.82823 \times 10^{-1}$ |
| $R_{s0}$ | 1.35135 |
| $b_{01}$ | — |
| $b_{02}$ | $5.00000 \times 10^{-2}$ |
| $b_{03}$ | — |
| $b_{04}$ | — |
| $b_{05}$ | — |
| $b_{06}$ | — |
| $b_{07}$ | — |
| $b_{08}$ | — |
| $b_{09}$ | — |
| $b_{10}$ | — |

| PRISM FACE PITCH (mm) | LIGHT INTENSITY AT SIGNAL AREA : A | LIGHT INTENSITY AT GHOST AREA : B | B/A |
|---|---|---|---|
| 0.8 | 0.1032 | 0.0330 | 0.320 |
| 0.4 | 0.1394 | 0.0147 | 0.105 |
| 0.2 | 0.1566 | 0.0094 | 0.060 |
| 0.1 | 0.1582 | 0.0093 | 0.059 |

| DIFFUSING FACE IS SET? | LIGHT INTENSITY AT SIGNAL AREA : A | LIGHT INTENSITY AT GHOST AREA : B | B/A |
|---|---|---|---|
| NO | 0.1582 | 0.0093 | 0.059 |
| YES | 0.1216 | 0.0017 | 0.014 |

PRISM FACE PITCH : 0.1mm

IMAGING SYSTEM, PRINT HEAD, IMAGE FORMING APPARATUS, AND IMAGE SCANNER

CROSS-REFERENCE TO RELATED APPLICATION

This application claims priority pursuant to 35 U.S.C. §119 to Japanese Patent Application No. 2012-161098, filed on Jul. 20, 2012 in the Japan Patent Office, the disclosure of which is incorporated by reference herein in its entirety.

BACKGROUND

1. Technical Field

The present invention relates to an imaging system, a print head, an image forming apparatus, and an image scanner, and more particularly to, an imaging system, a print head having the imaging system, an image forming apparatus and an image scanner.

2. Background Art

With the increasing sophistication of information processing apparatuses, demand has grown for laser printers and copiers for small offices and home offices (SOHO).

These laser printers and copiers include an exposing device, which is configured as, for example, a print head having a light source and a lens array, in which the light source includes a plurality of light emitting elements such as a light emitting diode (LED) array or an organic electro luminescence (OEL) array. The exposing device can be configured using a semiconductor laser and a polygon scanner. The print head can be compact compared to a combination of the semiconductor laser and polygon scanner.

JP-2000-108405-A, JP-2000-108403-A, JP-H04-336559-A, JP-S63-225218-A, JP-H10-153751-A, and JP-4574063-B (JP-2002-350604-A) disclose various optical systems used for the print head. However, image forming apparatuses using conventional print heads have difficulty satisfying the demand for improved image quality.

SUMMARY

One aspect of the present disclosure provides an imaging system that includes an incidence face having a plurality of optical faces formed along a first axis with a first pitch; a prism face having a plurality of grooves formed along the first axis with a second pitch different from the first pitch, being disposed on an optical path of light coming from the incidence face; and an exit face having a plurality of optical faces formed along the first axis with a third pitch, being disposed on an optical path of light coming from the prism face. Each one of the optical faces of the incidence face and each one of the optical faces of the exit face are aligned at the same position of the first axis. A virtual plane extends from an end of the one optical face of the incidence face in the first axis to an end of the one optical face of the exit face in the first axis. Among light flux emitted from a spot light source and entering the one optical face of the incidence face, a light beam that passes over the virtual plane is reflected at the prism face, and passes over the virtual plane again and goes to the one optical face of the exit face.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 shows example parameters for setting a given shape for the incidence optical face;

Figure 1:
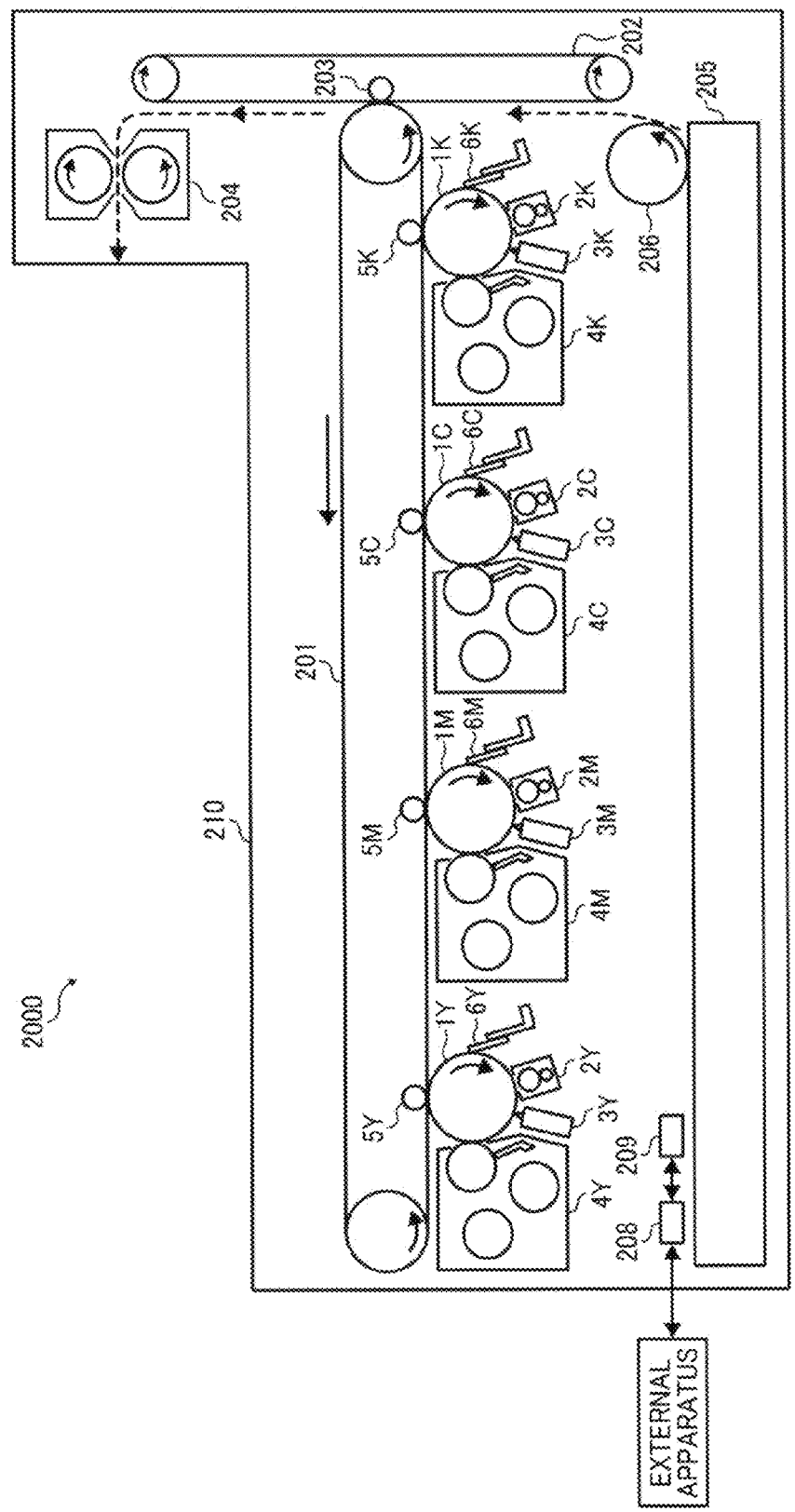
FIG. 1 shows a schematic configuration of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result.

Referring now to the drawings, apparatuses or systems according to example embodiments are described hereinafter.

A description is now given an image forming apparatus 2000 according to an example embodiment with reference to FIGS. 1 to 23. FIG. 1 shows a schematic configuration of the image forming apparatus 2000, which may be used as a color printer but not limited hereto.

The image forming apparatus 2000 is, for example, a multi-color printer employing a tandem system which can form a full-color image by superimposing four colors such as black, cyan, magenta, and yellow. The image forming apparatus 2000 includes, for example, four photoconductive drums 1K, 1C, 1M, 1Y, four chargers 2K, 2C, 2M, 2Y, four print heads 3K, 3C, 3M, 3Y, four development units 4K, 4C, 4M, 4Y, four transfer rollers 5K, 5C, 5M, 5Y, four cleaning units 6K, 6C, 6M, 6Y, an intermediate transfer belt 201, a transport belt 202, a secondary transfer roller 203, a fusing device 204, a sheet-feed tray 205, a sheet-feed roller 206, a communication controller 208, and an apparatus controller 2090 that controls above each unit as a whole, and a printer housing 210 that encases the above each unit. In this disclosure, the print head can function as a writing head.

The communication controller 208 controls bi-directional communications with external apparatuses such as personal computers via a network.

The apparatus controller 209 includes, for example, a central processing unit (CPU), a read only memory (ROM), a random access memory (RAM), and an analog/digital (A/D) converter. The ROM stores software programs using coding readable by the CPU, and data to be used with the software programs. The RAM can be used as a working memory. The A/D converter converts analog data to digital data.

The photoconductive drum 1K, the charger 2K, the print head 3K, the development unit 4K, and the cleaning unit 6K are assembled as an image forming station to form an image of black (hereinafter, K station).

The photoconductive drum 1C, the charger 2C, the print head 3C, the development unit 4C, and the cleaning unit 6K are assembled as an image forming station to form an image of black (hereinafter, C station).

The photoconductive drum 1M, the charger 2M, the print head 3M, the development unit 4M, and the cleaning unit 6M are assembled as an image forming station to form an image of black (hereinafter, M station).

The photoconductive drum 1Y, the charger 2Y, the print head 3Y, the development unit 4Y, and the cleaning unit 6Y are assembled as an image forming station to form an image of black (hereinafter, Y station).

Each of the photoconductive drums has a photoconductive layer as a surface layer, which is used as a scanned face.

Each of the photoconductive drums can be rotated in a direction shown by an arrow in FIG. 1 by a driving unit.

Each of the chargers charges the surface of corresponding photoconductive drum uniformly.

Under the control of the apparatus controller 2090, each print head radiates a modulated light beam, modulated based on image information of corresponding each color, on a surface of a corresponding charged photoconductive drum, by which a latent image corresponding to each set of color image information can be formed on the corresponding photoconductive drum. As the photoconductive drum rotates, the formed latent image is moved to a postion facing a corresponding development unit. The print head will be described in detail later.

Each development unit develops the latent mage formed on the corresponding photoconductive drum as a toner image by supplying toner. After the development using toner, the toner image is moved toward the corresponding transfer roller as the photoconductor drum rotates.

Each transfer roller transfers the toner image to the intermediate transfer belt 201. Yellow, magenta, cyan, and black toner images are sequentially superimposed on the intermediate transfer belt 201 to form a color image.

The sheet-feed tray 205 stores recording media such as recording sheets. The sheet-feed roller 206 disposed near the sheet tray 205 can be used to feed out the recording sheets one by one from the sheet tray 205. The recording sheet can be fed to the transport belt 202 at a given timing.

The recording sheet on the transport belt 202 moves toward the intermediate transfer belt 201, and the color image on the intermediate transfer belt 201 is transferred to the recording sheet on the transport belt 202 using the secondary transfer roller 203. Then, the recording sheet transferred with the color image is fed to the fusing unit 204.

The fusing unit 204 applies heat and pressure to the recording sheet to fuse the toner on the recording sheet. Upon fusing the toner image, the recording sheet is transported to a sheet-ejection tray via a sheet-ejection roller, and stacked on the sheet-ejection tray one by one.

Each of the cleaning unit removes remaining toner from the surface of corresponding photoconductive drum. Upon removing the remaining toner, the photoconductive drum can be set at a position facing the corresponding charger again.

The image forming apparatus 2000 includes, for example, a movement mechanism for each print head. The movement mechanism moves the print head between a first position that the print head is close to a surface of a corresponding photoconductive drum, and a second position that the print head is separated from the surface of the corresponding photoconductive drum.

The first position is used when a latent image is formed on the photoconductive drum. The second position is a retracted position which is used when conducting a maintenance work. The movement mechanism includes, for example, a spring, a print head holder to hold a corresponding print head, and an entire print head holder to hold the spring and the print head holder. The spring can press the print head holder toward the surface of the photoconductive drum. When the print head is retracted, the spring pulls the print head holder from the surface of the photoconductive drum to retract the print head.

A description is now given of the print head. Because all four print heads employ substantially the same configuration, only the print head 3K of the K station is described in detail.

Figure 2:
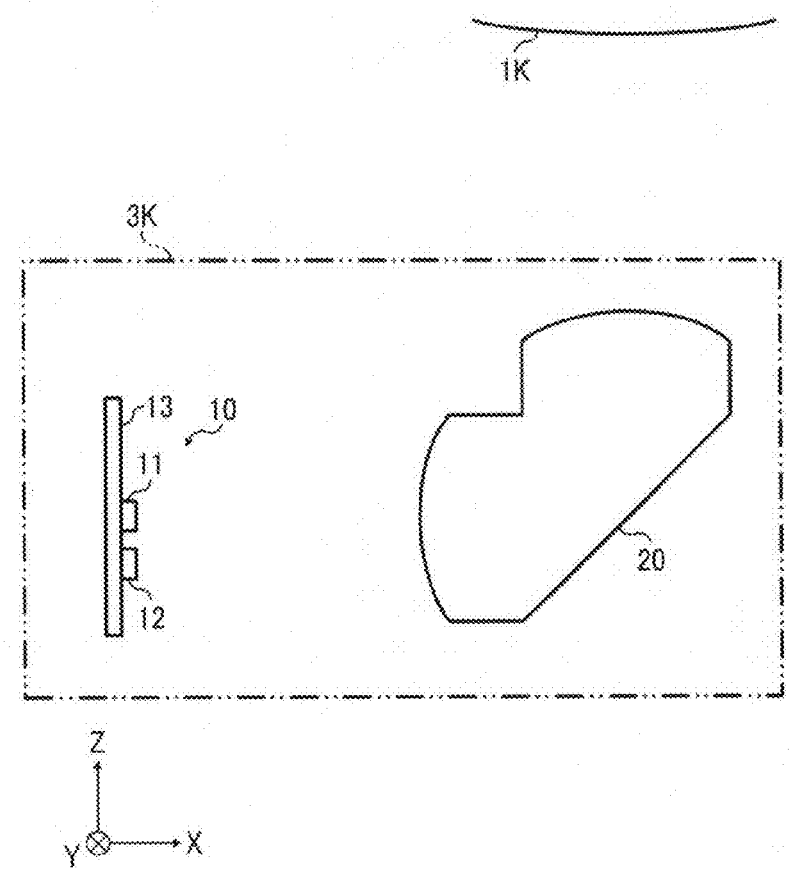
FIG. 2 shows a schematic configuration of a print head.

The print head 3K includes, for example, a light source 10, and an imaging system 20 as shown in FIG. 2.

In the three dimensional orthogonal coordinate system such as XYZ coordinate system, a direction along the axis of the photoconductive drum 1K (e.g., long direction) is set as the Y-axis, and a direction along the exiting direction of light beam (e.g., main light beam) exiting from the print head 3K is set as the Z-axis.

Figure 3:
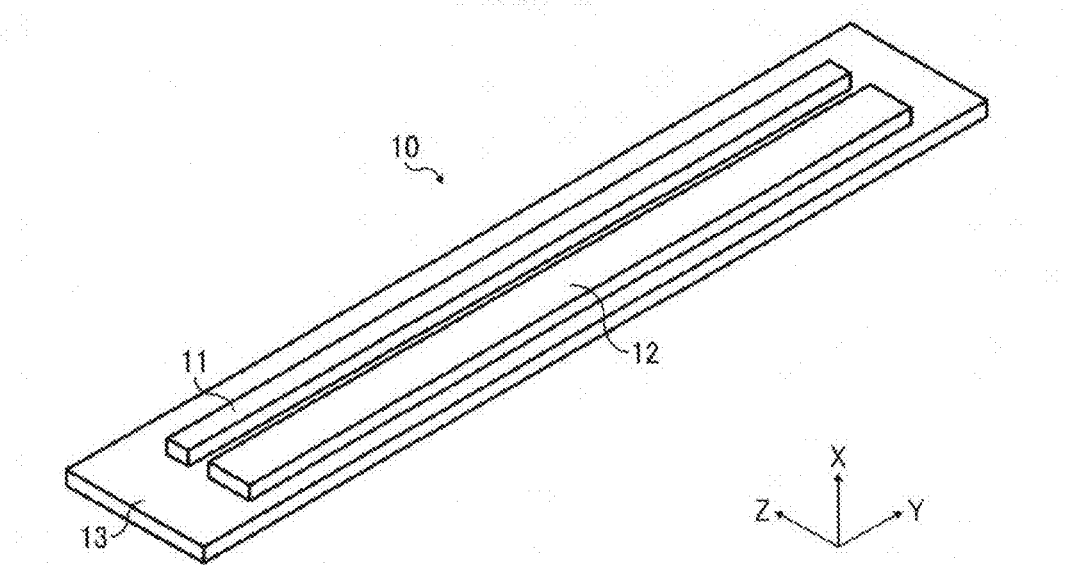
FIG. 3 shows a schematic configuration of a light source of a print head.

The light source 10 includes, for example, a light emitting element 11, a drive unit 12, and a base board 13 as shown in FIG. 3.

The base board 13 is, for example, a plate member of a rectangular shape having a longer side in the Y-axis. The light emitting element 11 and the drive unit 12 are disposed on the +X side face of the base board 13.

Figure 4:
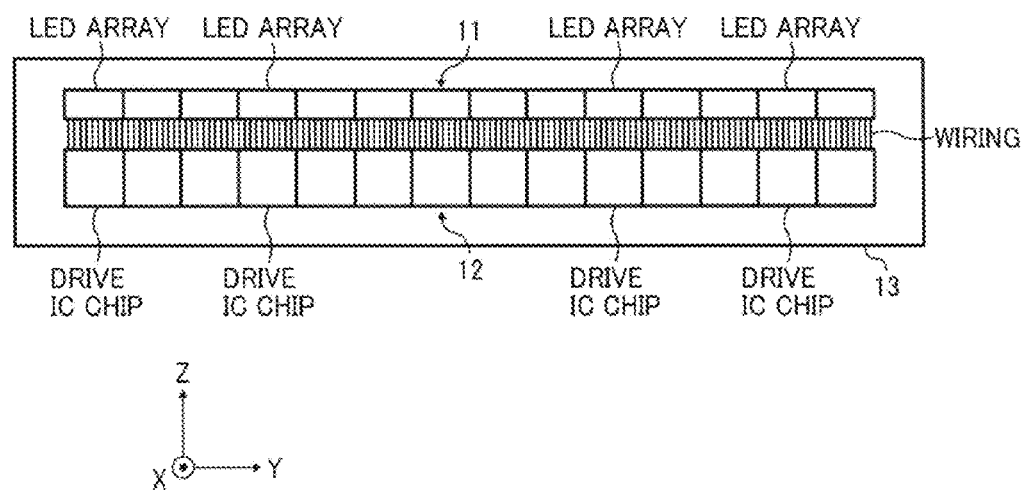
FIG. 4 shows a schematic configuration of a light source having a plurality of LED arrays and drive-IC chips.

The light emitting element 11 is configured with, for example, a plurality of LED arrays as shown in FIG. 4, and the plurality of LED arrays are disposed along the Y-axis. Each of the LED arrays includes, for example, a plurality of LED elements arranged along the Y-axis. Therefore, the light emitting element 11 includes a plurality of light emitting elements arranged along the Y-axis on the base board 13. Each of the LED elements emits light to the +X-axis.

The light emitting element 11 is configured specifically depending on the sheet size and the writing density. For example, when the light emitting element 11 is configured for A4 sheet (210 mm) with the writing density of 600 dpi (dot per inch), 4,960 LED elements are required with about 42.3 µm pitch. If one LED array including 100 LED elements is used, 50 LED arrays are installed on the base board 13.

Further, for example, when the light emitting element 11 is configured for A3 sheet (297 mm) with the writing density of 1200 dpi, 14,009 LED elements are required with about 21.2 µm pitch. If one LED array including 100 LED elements is used, 141 LED arrays are installed on the base board 13.

The drive unit 12 includes, for example a plurality of drive integrated circuit (IC) chips for each one of the plurality of LED arrays as shown in FIG. 4. The plurality of drive IC chips is arranged along the Y-axis. Each of the drive IC chips includes a plurality of drive transistors, and the drive transistor is used for the LED element one by one.

Figure 5:
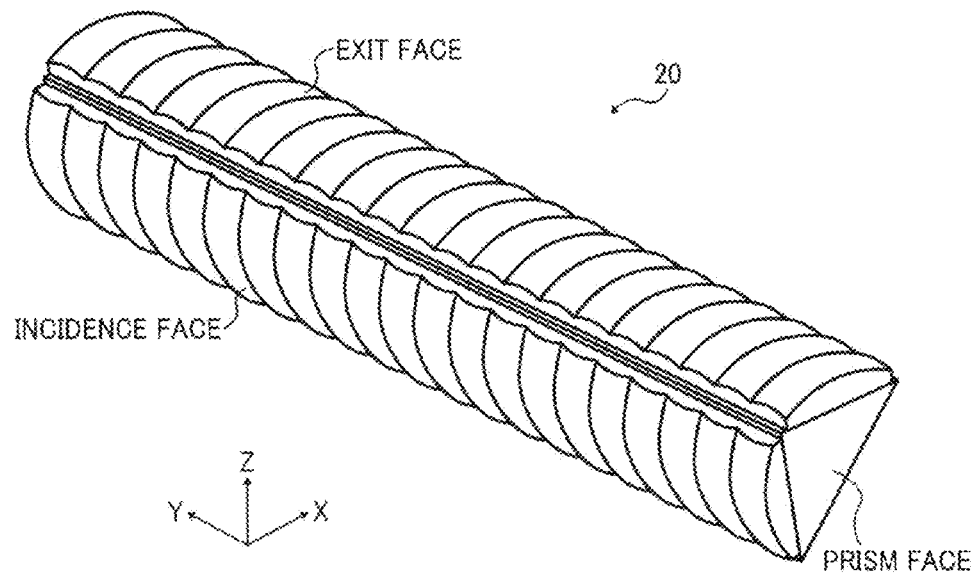
FIG. 5 shows a schematic perspective view of an imaging system of a print head.
Figure 6:
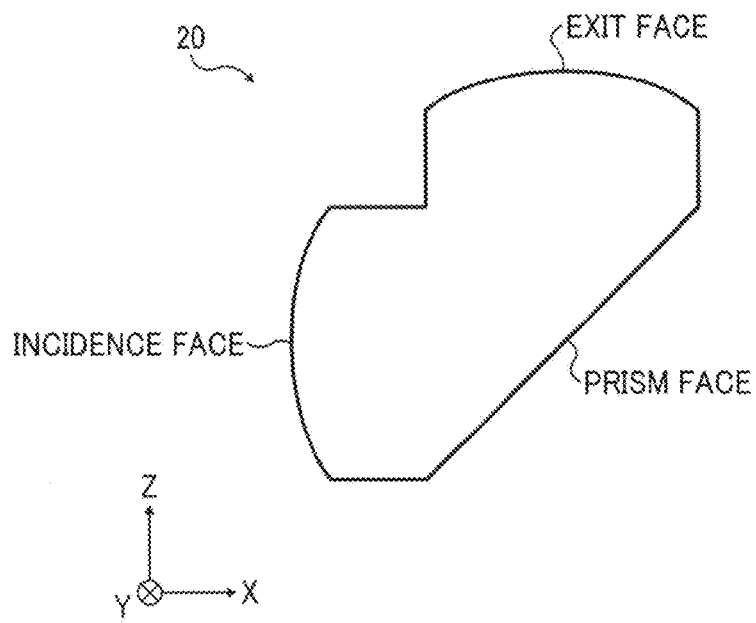
FIG. 6 shows a schematic cross-sectional view of the imaging system cut on a XZ plane.

Referring back to FIG. 2, the imaging system 20 is disposed at the +X side direction of the light source 10. FIG. 5 shows a perspective view of the imaging system 20, and FIG. 6 shows a cross-sectional view of the imaging system 20 cut at X-Z plane. The imaging system 20 is made of, for example, resin by using a molding method.

Figure 7:
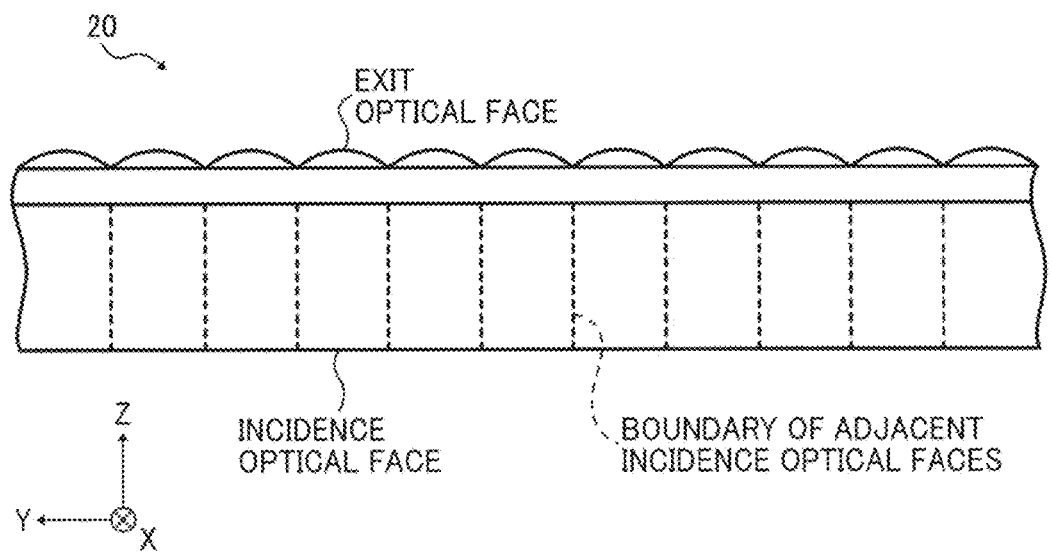
FIG. 7 shows a schematic view of incidence optical faces of the imaging system.

The imaging system 20 includes an incidence face, for example, at −X side. The incidence face includes, for example, a plurality of incidence optical faces formed along the Y-axis with a given pitch (hereinafter, incidence face pitch or first pitch) as shown in FIG. 7. In the present embodiment, the incidence face pitch (first pitch) is, for example, 0.8 mm.

Figure 8:
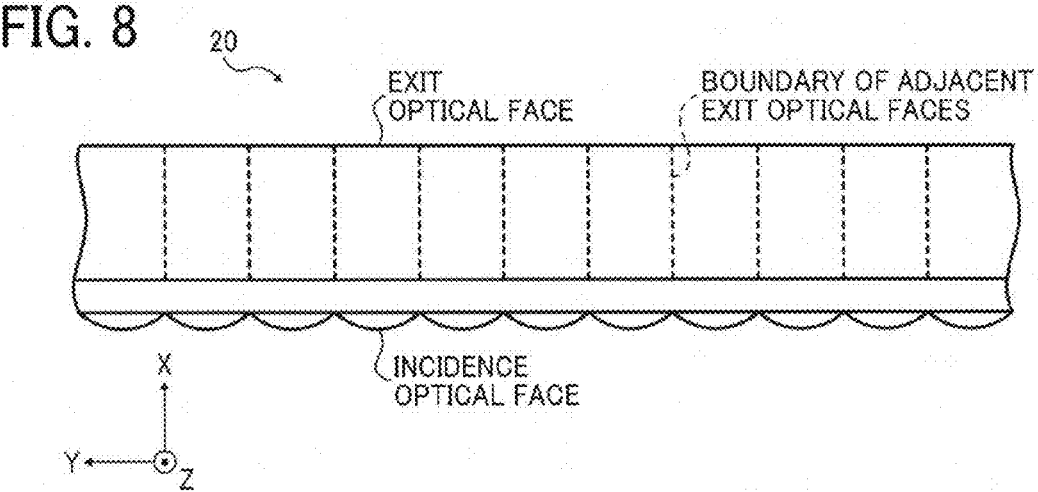
FIG. 8 shows a schematic view of exit optical faces of the imaging system.

Further, the imaging system 20 includes an exit face, for example, at +Z side. The exit face includes, for example, a plurality of exit optical faces formed along the Y-axis with a given pitch (hereinafter, exit face pitch or third pitch) as shown in FIG. 8. In the present embodiment, the exit face pitch (third pitch) is, for example, 0.8 mm.

The plurality of the incidence optical faces of the incidence face and the plurality of exit optical faces of the exit face are formed along the Y-axis without phase deviation, which means one incidence optical face and one exit optical face are matched with each other at the same position on the Y-axis as shown in FIGS. 7 and 8.

Figure 9:
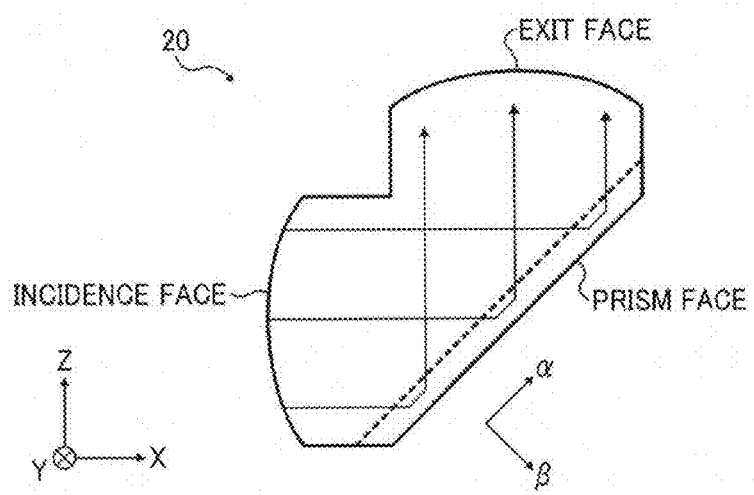
FIG. 9 shows a schematic view of effect of a prism face.

Further, the imaging system 20 includes a prism face that reflects an optical path of light coming from the incidence face to a direction going to the exit face as shown in FIG. 9. Further, on the XZ-plane, the axis parallel to the prism face is set as α-axis, and the axis perpendicular to the α-axis is set as β-axis as shown in FIG. 9.

Figure 10:
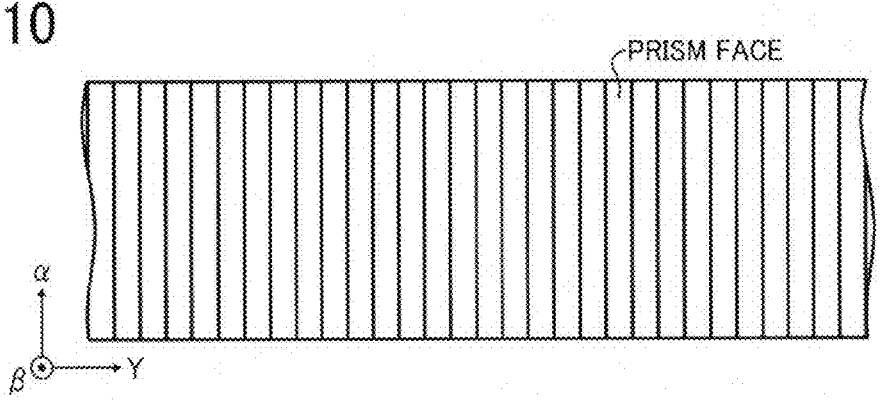
FIGS. 10 and 11 show schematic views of the prism face having a given shape.
Figure 11:
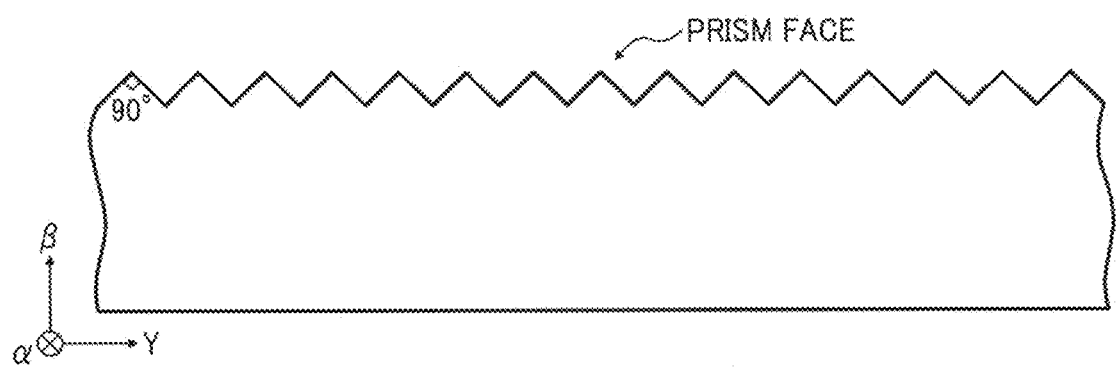

FIG. 10 shows the prism face viewed from the β-axis, and FIG. 11 shows the prism face viewed from the α-axis.

The prism face is angled, for example, 45 degrees with respect to both the YZ-plane and the XY-plane. Further, the prism face is formed with V-shaped grooves extending along the α-axis with a given pitch (hereinafter, prism face pitch or second pitch), which means that a plurality of prisms are arranged along the Y-axis. As shown in FIG. 11, the prism angle of each prism is, for example, 90 degrees. In the present embodiment, the prism face pitch (second pitch) is, for example, 0.1 mm.

Figure 12:
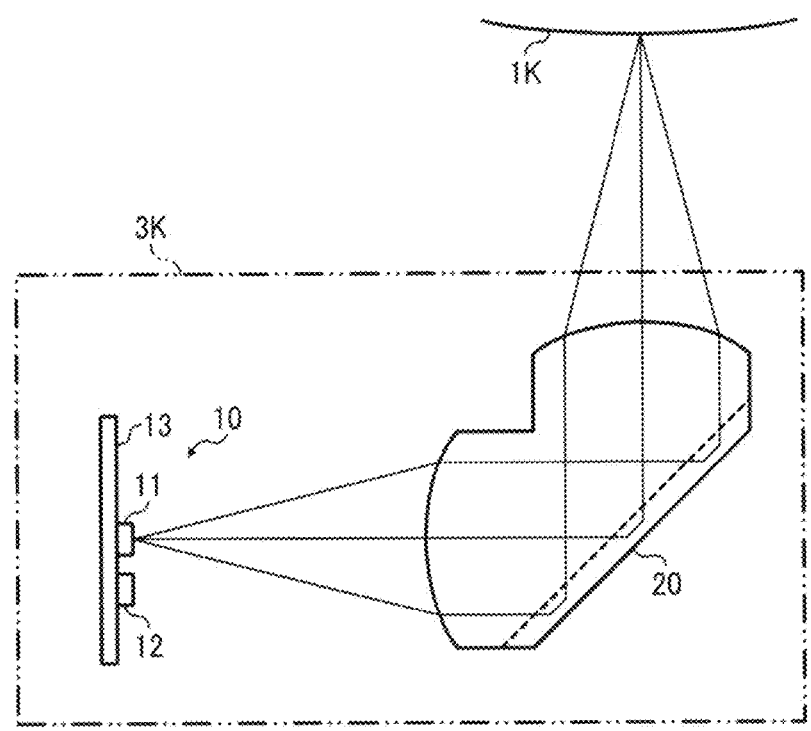
FIG. 12 shows an optical path passing through the imaging system viewed from one direction.

The light emitted from the light source 10 is irradiated onto the surface of the photoconductive drum 1K via the incidence face, the prism face, and the exit face of the imaging system 20 as shown in FIG. 12.

Figure 13:
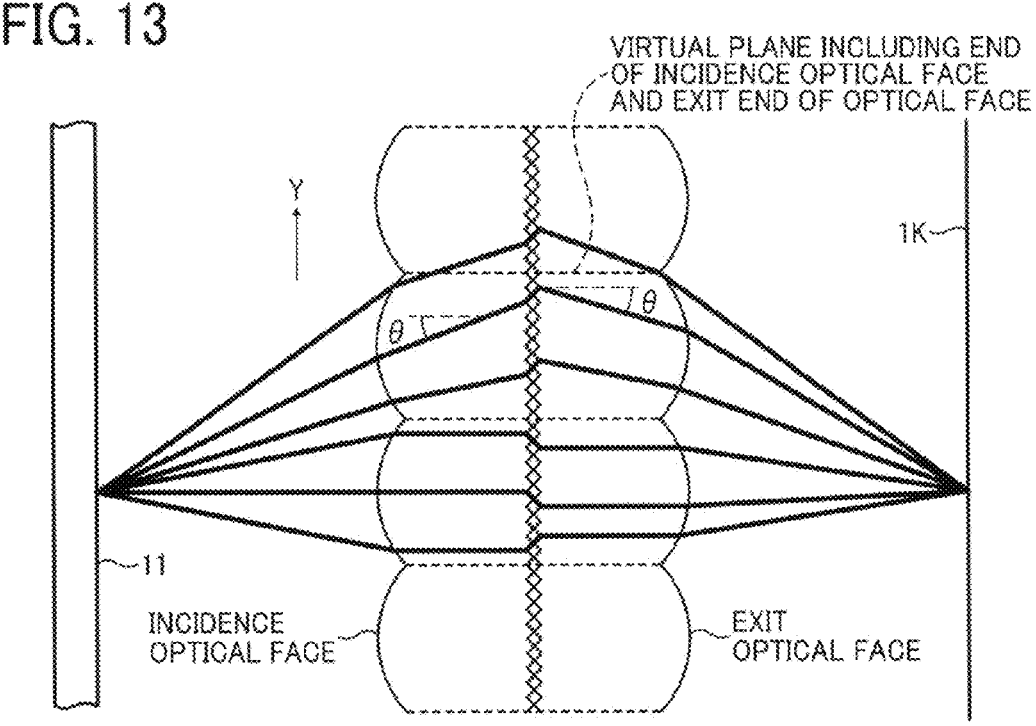
FIG. 13 shows an optical path passing through the imaging system viewed from another direction.

FIG. 13 shows a view of the imaging system 20 rotated about the Y-axis to place the incidence face and the exit face at the opposite positions in the drawing. The light beam entering the prism face is totally reflected, for example, for two (2) times. With this configuration, the light beam which enters the prism face with an angle θ can be exit from the prism face with the angle θ, which is the same angle θ of the light beam entering the prism face with respect to the Y-axis. Such optical system is referred to as a retroreflective optical system. With this configuration, a upright image can be focused in the arrangement direction such as the Y-axis, and thereby light coming from one point of an object passes the plurality of incidence optical faces, and then focused at a substantially at one point, in which the focused image can become a bright image.

Further, as for the XZ-plane, as shown in FIG. 12, the optical path is reflected 90 degrees at the prism face with the total reflection, and thereby the image is focused two faces such as the incidence optical face and the exit optical face, which is an usual image-focus optical system, and an inverted image can be focused in a direction perpendicular to the arrangement direction.

Figure 14:
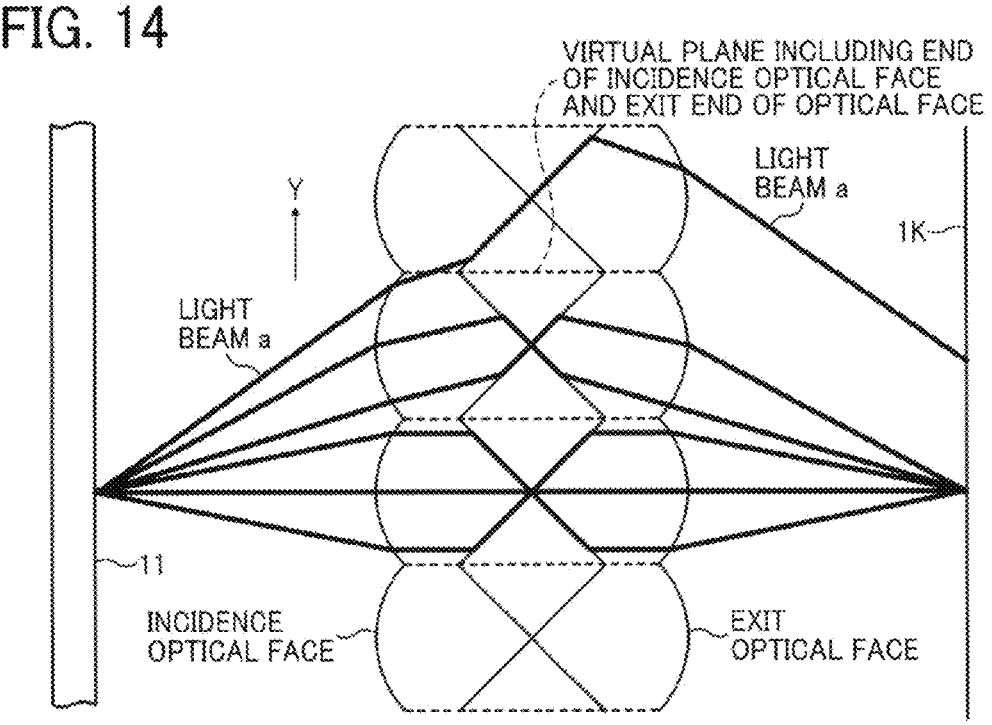
FIG. 14 shows an optical path passing through an imaging system of comparison example.

A description is now given for a comparison example case that the prism face pitch (second pitch) is the same as the incidence face pitch (first pitch) and the exit face pitch (third pitch) such as 0.8 mm with reference to FIG. 14. Similar to FIG. 13, FIG. 14 shows a view of the imaging system 20 rotated about the Y-axis to place the incidence face and the exit face at the opposite positions in the drawing.

In this configuration shown in FIG. 14, a light beam "a" passes over a virtual plane connecting an end portion of the incidence optical face and an end portion of the exit optical face disposed at the same position on the Y-axis, in which the light beam "a" reaches a position different from a desired position on the photoconductive drum 1K, and thus becomes a ghost light. This ghost light occurs because the positional deviation of light beam on the prism face with respect to the Y-axis occurs, in which the incidence optical face that the light beam "a" enters and the exit optical face that the light beam "a" exits are not corresponded.

A description is now given of results of various simulations, in which following example conditions are used. The center of wavelength of light emitted from each of the LED elements is 620 nm. As for the imaging system 20, a distance from an object point to the incidence face is 2.4 mm, a distance from the exit face to the surface of the photoconductive drum is 2.4 mm, a distance from the incidence face to the center of the prism face is 2.5 mm, and a distance from the center of the prism face to the exit face is 2.5 mm. Further, an aperture member having an aperture having an opening width of 1.4 mm is disposed right before the incidence face to regulate a width of the incident light flux in the Z-axis. Further, the incidence face pitch (first pitch) and the exit face pitch (third pitch) are 0.8 mm. Further, the object point is at the center of the incidence face.

Each incidence optical face can be defined by following formula (1) and formula (2). Formulas (1) and (2)

$$X(Y, Z) = \frac{(1/R_{m0}) \cdot Z^2}{1 + \sqrt{1 - (1 + a_{00}) \cdot (1/R_{m0})^2 \cdot Z}} + \tag{1}$$
$$a_{01} \cdot Z + a_{02} \cdot Z^2 + a_{03} \cdot Z^3 + \ldots + \frac{C_s(Z) \cdot Y^2}{1 + \sqrt{1 - C_s(Z)^2 \cdot Y^2}}$$

$$C_s(Z) = \frac{1}{R_{s0}} + b_{01} \cdot Z + b_{02} \cdot Z^2 + b_{03} \cdot Z^3 + \ldots \tag{2}$$

FIG. 15 shows a table including parameters for each coefficient of the formula (1) and formula (2). As for each incidence optical face, a cross-sectional shape perpendicular to the center of the incidence optical face and the Y-axis is a non-arc shape, a cross-sectional shape perpendicular to the Z-axis is an arc shape, and a radius of curvature of the arc shape changes depending on a position with respect to the Z-axis. Further, each exit optical face has, for example, the same shape of the incidence optical face.

Further, the imaging system 20 is made of resin material, and Nd=1.53048, vd=55.78, N (620 nm)=1.52903.

Figure 16:
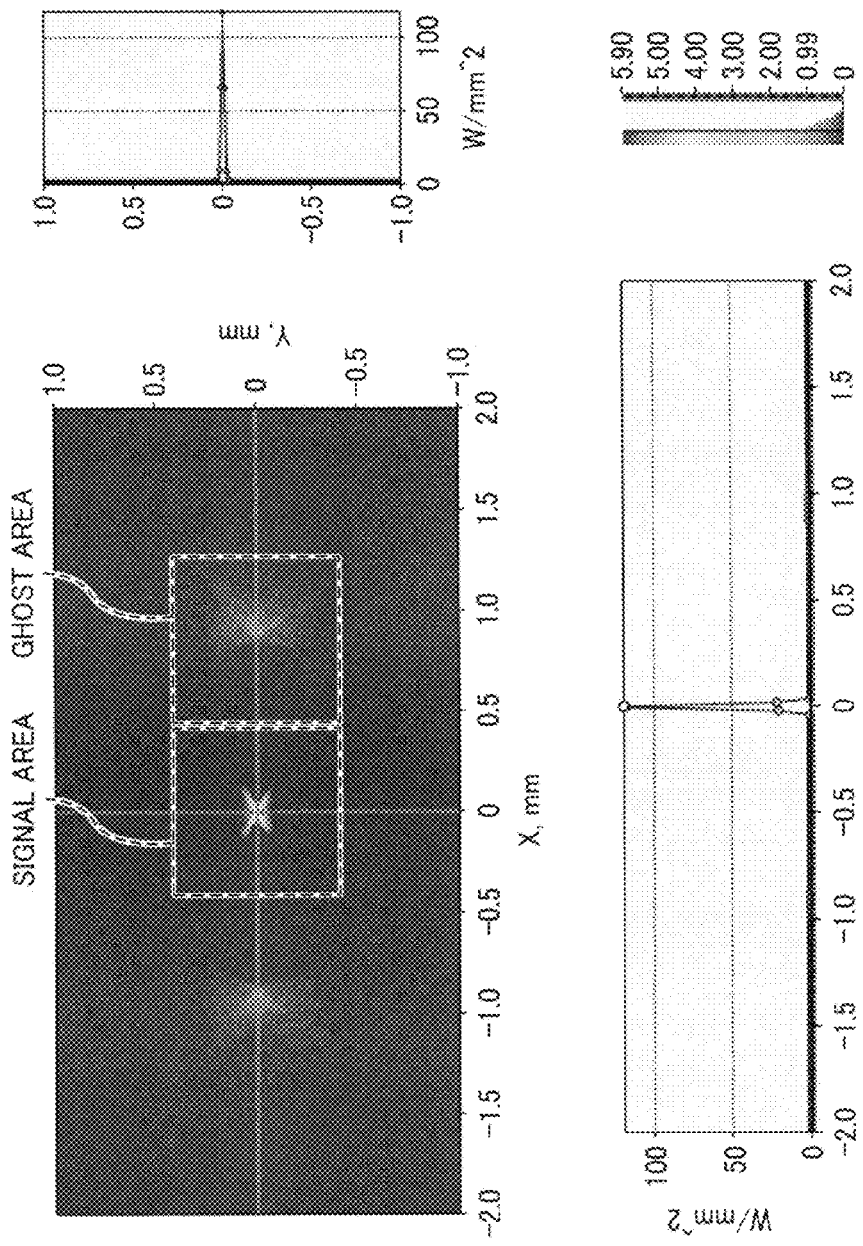
FIGS. 16, 17, 18 and 19 show simulation results.
Figure 17:
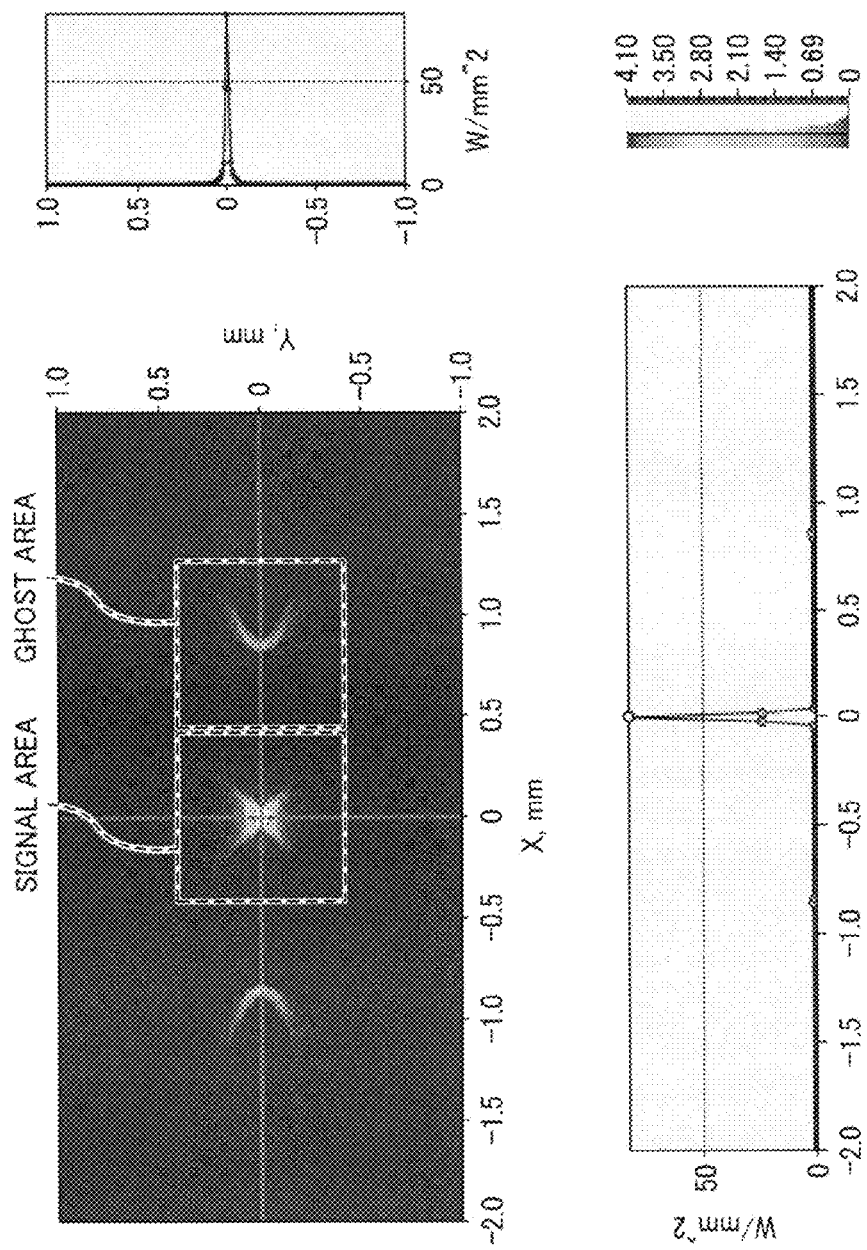
Figure 18:
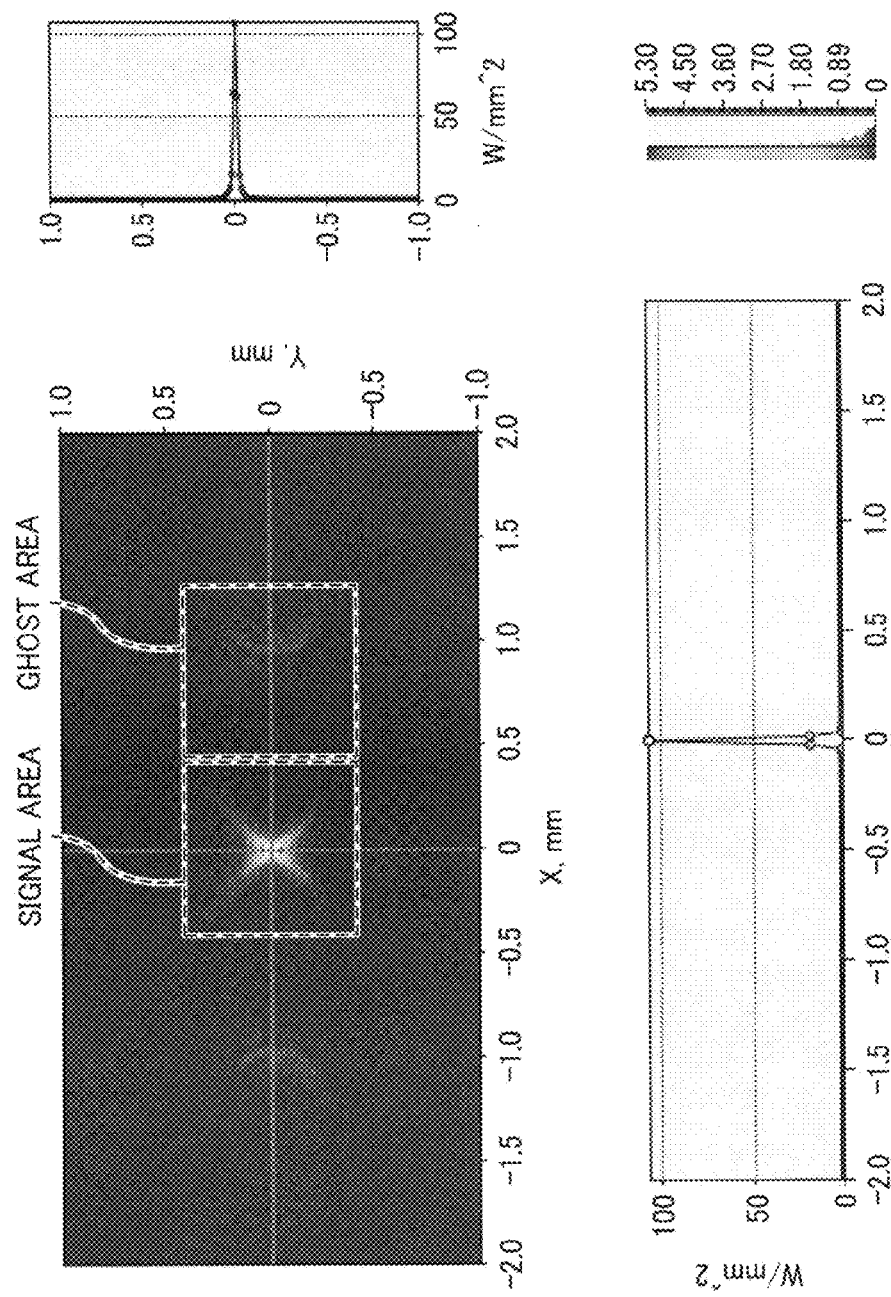
Figure 19:
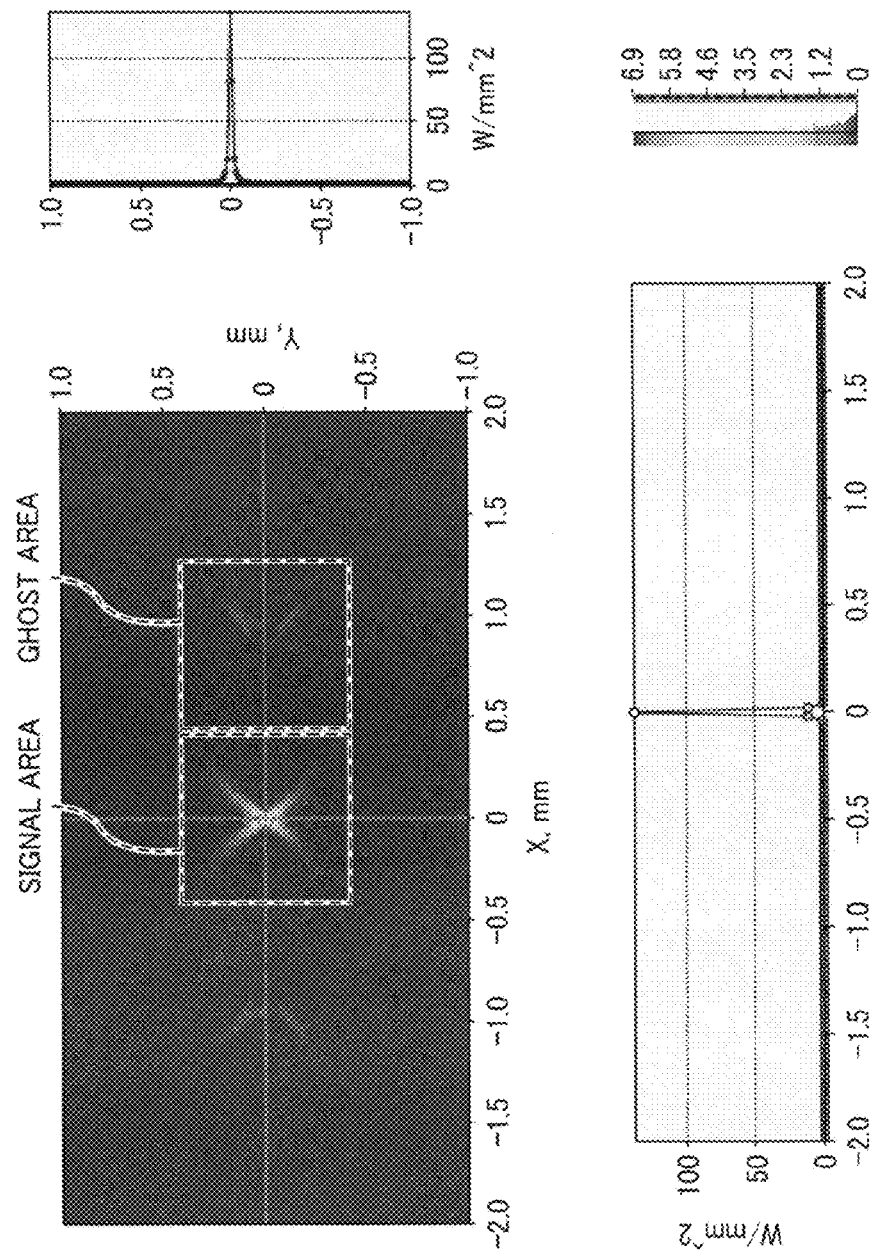

FIG. 16 shows a simulation result when the prism face pitch is 0.8 mm. FIG. 17 shows a simulation result when the prism face pitch is 0.4 mm. FIG. 18 shows a simulation result when the prism face pitch is 0.2 mm. FIG. 19 shows a simulation result when the prism face pitch is 0.1 mm. Further, in FIGS. 16 to 19, the image focus position is X=0 and Y=0. In FIGS. 16 to 19, the signal is an area encircled by X=−0.4 mm to +0.4 mm and Y=−0.4 mm to +0.4 mm, and the ghost is an area encircled by X=+0.4 mm to +1.2 mm and Y=−0.4 mm to +0.4 mm. Further, in FIGS. 16 to 19, the light intensity is indicated by enhancing the light intensity by 20 times.

Figures 20, 21:
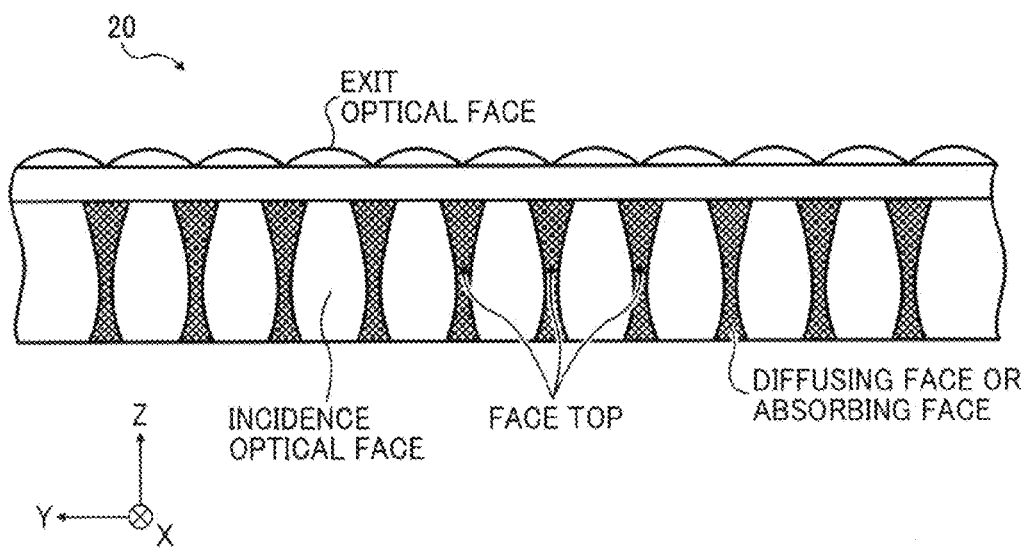
FIG. 20 shows a relationship of a prism face pitch, light intensity at a signal area and light intensity at a ghost area.
FIG. 21 shows a diffusing face or an absorbing face from one direction.

FIG. 20 shows a relationship of the prism face pitch, and the light intensity at the signal and the light intensity at the ghost obtained from the simulations, in which the light intensity of a light emitting area at the object point is set one. Hereinafter, a ghost ratio (B/A) defined by dividing the light intensity at the ghost (B) with the light intensity at the signal (A) can be used.

The simulation results indicate that when the prism face pitch is 0.8 mm, ghost lights occur greatly, and when the prism face pitch is 0.4 mm or less, the ghost light can be minimized and thereby the light intensity of the signal light increases. As described above, the incidence face pitch (first pitch) is 0.8 mm in this example case. Therefore, by setting the prism face pitch (second pitch) smaller than the incidence face pitch (first pitch), specifically, by setting the prism face pitch one-half or less of the incidence face pitch (first pitch), the occurrence of the ghost light can be minimized, and the light intensity of light focused at a desired position can be increased.

Further, if the prism face pitch is too small, diffraction light occurs, by which the loss of light intensity occurs. Therefore, the prism face pitch is preferably 20 times or more of wavelength of the incident light entering the prism face.

Figures 22, 23:
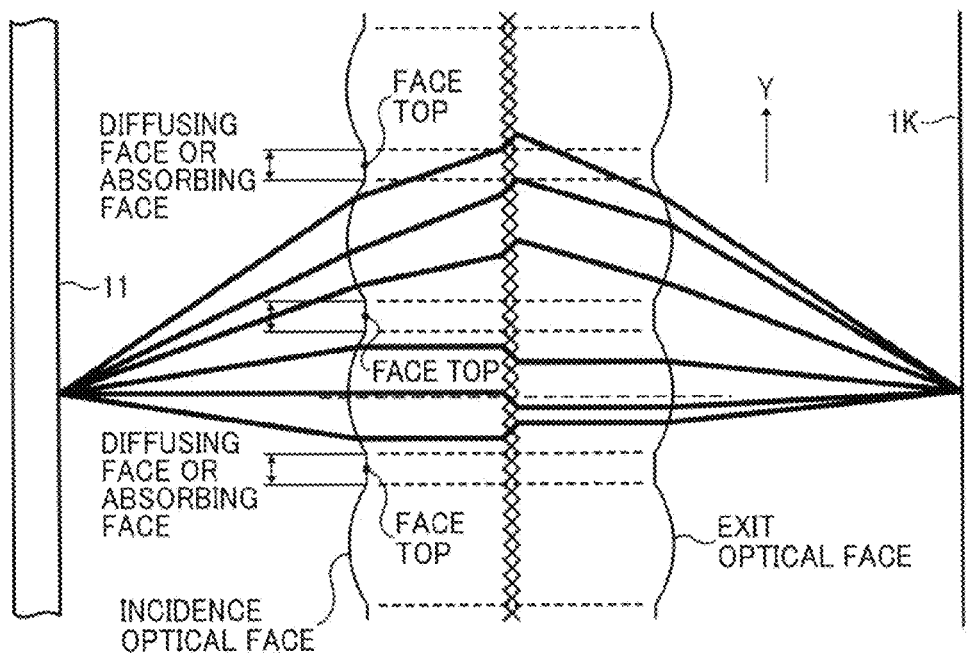
FIG. 22 shows a diffusing face or an absorbing face viewed from another direction.
FIG. 23 shows an effect of the diffusing face.

The light beam passing near the boundary of two adjacent incidence optical faces, and/or the light beam passing near the boundary of two adjacent exit optical faces may more likely become the ghost light. Therefore, as shown in FIGS. 21 and 22, a diffusing face that can diffuse light or an absorbing face that can absorb or block light can be disposed for each boundary to further suppress the occurrence of ghost light. Further, the light scattered at each boundary may reach the surface of the photoconductive drum, but not focused, and thereby the scattered light may not cause a problem.

Similar to FIG. 13, FIG. 22 shows a view of the imaging system 20 rotated about the Y-axis to place the incidence face and the exit face at the opposite positions in the drawing.

The shape of the incidence optical face and the exit optical face are preferably a convex shape with respect to the diffusing face or the absorbing face. With this configuration, an unnecessary step may not occur at the boundary between the incidence optical face and the diffusing face or the absorbing face, and at the boundary between the exit optical face and the diffusing face or the absorbing face, by which partial cutting of the signal light at the boundary can be prevented.

At the incidence optical face, a light beam passing through a position far from the center of the incidence optical face with respect to the Z-axis is more likely to become the ghost light. Therefore, as shown in FIG. 21, the farther from the center of the incidence optical face, the width of the diffusing face or the absorbing face (i.e., width in the Y-axis) is preferably increased. With this configuration, the ghost light can be further minimized.

To increase the width of the diffusing face or the absorbing face as farther from the center of the incidence optical face with respect to the Z-axis, a cross-sectional shape of the diffusing face or the absorbing face perpendicular to the Y-axis is preferably formed as a curving shape, and more preferably an arc shape. With this configuration, processing difficulty level when manufacturing the imaging system 20 can be lowered, and the cost increase can be minimized, and the imaging system 20 can be provided stably with high quality.

Further, a cross-sectional shape of the diffusing face or the absorbing face perpendicular to the Z-axis can be formed as a curving shape, but processing difficulty level when manufacturing the imaging system 20 becomes high, and the cost may increase. Therefore, the cross-sectional shape of the diffusing face or the absorbing face perpendicular to the Z-axis is preferably formed straight.

Further, the light beam passing through near the boundary of the adjacent two incidence optical faces may become the ghost light due to the positional deviation of the light beam in the Y-axis at the prism face, in which due to the positional deviation of the light beam, the light beam passing through one incidence optical face does not pass through an exit optical face not corresponded to the incidence optical face but passes through a different exit optical face which is not corresponded to the incidence optical face, by which ghost light occurs. By providing the diffusing face or the absorbing face, even if the positional deviation of the light beam in the Y-axis at the prism face occurs, the passing of the light beam through the different exit optical face, not corresponded to the incidence optical face, can be minimized.

The positional deviation of the light beam with respect to the Y-axis at the prism face occurs with an amount equal to the prism face pitch. The positional deviation of the light beam occurs toward an inside direction or an outside direction. The inside direction of incident light entering the prism face is a direction that is closer to a light emitting point or an image focus point, and the outside direction of incident light entering the prism face is a direction that is far from a light emitting point or an image focus point. For example, as for the light beam at the most Y-side with respect to the Y-axis in FIG. 22, the inside direction of is −Y direction and the outside direction is +Y direction. The ghost light does not occur when the positional deviation of the light beam occurs toward the inside, but the ghost light occurs when the positional deviation of the light beam occurs toward the outside. Therefore, based on consideration of probability, a minimum width of the diffusing face or the absorbing face is set for a half or more of the prism face pitch (second pitch), by which the occurrence of ghost light can be effectively minimized.

The greater the minimum width of the diffusing face or the absorbing face, the occurrence of ghost light can be further minimized. However, if the minimum width of the diffusing face or the absorbing face is too great, the light intensity of the signal light decreases. Because the positional deviation of the light beam in the Y-axis at the prism face occurs with an amount equal to the prism face pitch, the positional deviation of the light beam in the Y-axis at the prism face is preferably substantially equal to the prism face pitch (second pitch). However, if a relative positional deviation may occur between the incidence optical face and the prism face due to the manufacturing error, the positional deviation of the light beam in the Y-axis at the prism face is preferably set two times or less of the prism face pitch (second pitch). With this configuration, the decrease of light intensity of signal light can be minimized, and the occurrence of ghost light can be effectively minimized.

The diffusing face to diffuse light can be disposed at near the boundary of the adjacent two incidence optical faces and/or near the boundary of the adjacent two exit optical faces. Hereinafter, the diffusing face disposed at near the boundary of the adjacent two incidence optical faces may be referred to an incidence diffusing face, and the diffusing face disposed at near the boundary of the adjacent two exit optical faces may be referred to an exit diffusing face.

The incidence diffusing face is, for example, a cylinder shape, in which a cross-sectional shape of the incidence diffusing face perpendicular to the Z-axis is a plane shape, and a cross-sectional shape of the incidence diffusing face perpendicular to the Y-axis is an arc shape. Further, a face top of diffusing face is set, for example, +0.05 mm position with respect to a face top of incidence optical face with respect to the X-axis. Further, a radius of curvature of incidence diffusing face having a cylinder shape is, for example, 1.724 mm, in which the minimum width of the diffusing face is about 0.07 mm. The shape of the exit diffusing face is the same as the incidence diffusing face.

FIG. 23 shows the light intensity of the signal (A), the light intensity of the ghost (B), and the ghost ratio (B/A) when the diffusing face exists or not using the prism face pitch (second pitch) of 0.1 mm. As indicated in FIG. 23, by disposing the diffusing face, the ghost ratio can be decreased to one-fourth ($1/4$) or so.

As described above, the print head of the example embodiment includes, for example, the light source 10 and the imaging system 20. The light source 10 includes, for example, a plurality of LED elements disposed along the Y-axis with an equal pitch.

The imaging system 20 includes the incidence face, the exit face, and the prism face. The incidence face has an optical axis parallel to the X-axis, and a plurality of incidence optical faces formed with a first pitch (incidence optical face pitch) along the Y-axis. The exit face has an optical axis parallel to the Z-axis, and a plurality of exit optical faces formed with a third pitch (exit optical face pitch) along the Y-axis. The prism face has a plurality of grooves formed with a second pitch (prism face pitch) along the Y-axis, which reflects the optical path of light coming from the incidence face to a direction toward the exit face.

For example, the incidence optical face pitch is 0.8 mm, the exit optical face pitch is 0.8 mm, and the prism face pitch (second pitch) is 0.1 mm.

With this configuration, the occurrence of ghost light can be minimized while the light use efficiency can be enhanced. Therefore, the amount of light emitted from the light source 10 can be reduced, by which the heat generation and power consumption can be decreased.

Further, the diffusing face to diffuse light can be disposed at the boundary of (near) the adjacent two incidence optical faces and/or the boundary of (near) the adjacent two exit optical faces, by which the occurrence of ghost light can be further minimized.

Therefore, the image forming apparatus 2000 can stably form an image having an enhanced quality while decreasing the power consumption.

Further, in the above described example embodiment, the imaging system 20 employs one optical element having integrated the incidence face, the exit face, and the prism face, but not limited hereto. For example, the imaging system 20 can employ a first optical element having the incidence face, a second optical element having the exit face, and a third optical element having the prism face.

Further, in the above described example embodiment, the prism face is angled with respect to the YZ-plane and XY-plane for 45 degrees, but not limited hereto. For example, the prism face can be angled more than 45 degrees with respect to the XY-plane.

Further, in the above described example embodiment, instead of the prism face, a mirror-coated reflection face can be used.

Further, in the above described example embodiment, both of the incidence diffusing face and the exit diffusing face are disposed, but not limited hereto. For example, at least one of the incidence diffusing face and the exit diffusing face can be disposed.

Further, in the above described example embodiment, instead of the LED element, an organic electro-luminescence (OEL) element can be used. Further, in the above described example embodiment, a plurality of LED elements are arranged along the Y-axis but not limited hereto.

Figure 24:
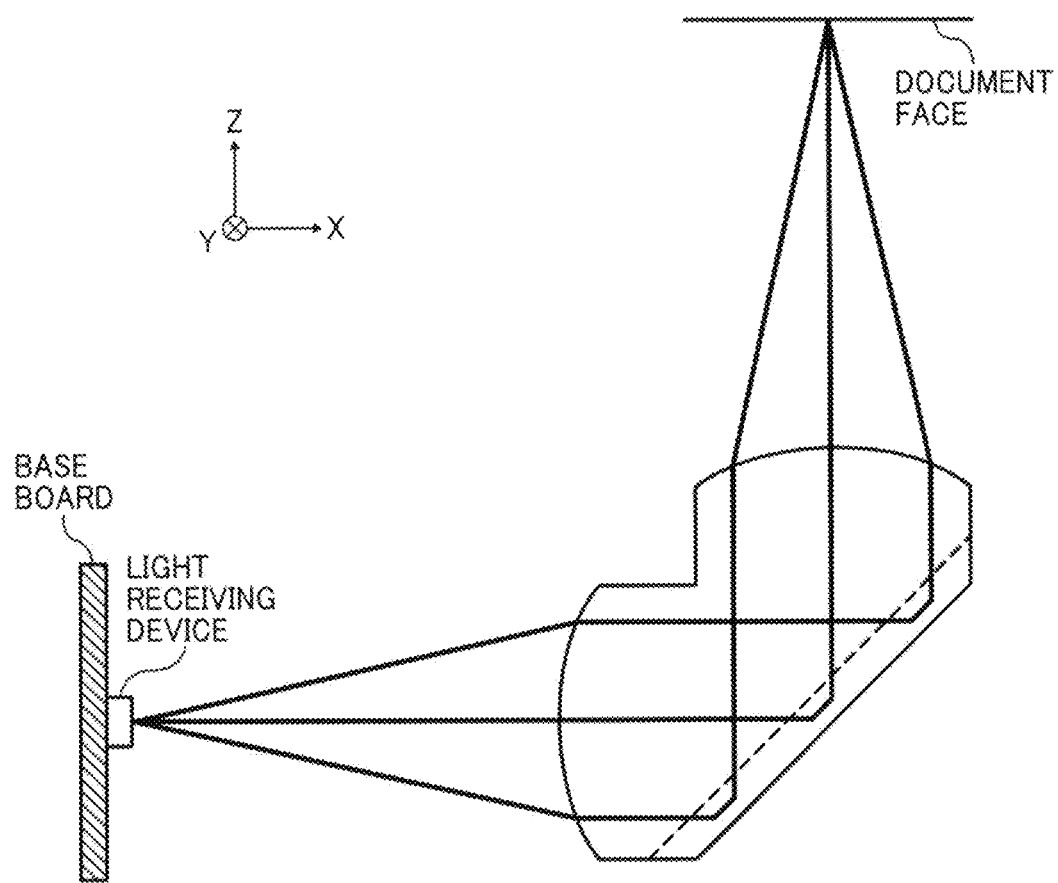
FIG. 24 shows a schematic configuration of an image scanner.

Further, the above described example embodiment can be used for an image scanner by replacing the light source 10 with a light receiving device having a plurality of light receiving elements arranged in an array as shown in FIG. 24. FIG. 24 shows a schematic configuration of the image scanner. Because the light use efficiency of the above described example embodiment is high, the light intensity received at each of the light receiving elements can be increased compared to conventional configurations. Therefore, a signal/noise (SN) ratio when scanning images on document can be enhanced, and scanned image quality can be enhanced.

The above described imaging system includes an incidence face having a plurality of optical faces formed along a first axis with a first pitch; a prism face having a plurality of grooves formed along the first axis with a second pitch, being disposed on an optical path of light coming from the incidence face; and an exit face having a plurality of optical faces formed along the first axis with a third pitch, being disposed on an optical path of light coming from the prism face. Each one of the optical faces of the incidence face and each one of the optical faces of the exit face are aligned at the same position of the first axis. A virtual plane extends from an end of the one optical face of the incidence face in the first axis to an end of the one optical face of the exit face in the first axis. Among light flux emitting from a spot light source and entering the one optical face of the incidence face, a light beam that passes over the virtual plane is reflected at the prism face, and passes over the virtual plane again and goes to the one optical face of the exit face.

By employing the above described imaging system, the occurrence of ghost light can be minimized without decreasing the light use efficiency.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An imaging system comprising:
    an incidence face having a plurality of optical faces formed along a first axis with a first pitch;
    a prism face disposed on an optical path of light coming from the incidence face, the prism face having a plurality of prisms formed along the first axis, the plurality of prisms have a second pitch which is different from the first pitch; and
    an exit face having a plurality of optical faces formed along the first axis with a third pitch, being disposed on an optical path of light coming from the prism face,
    wherein each one of the optical faces of the incidence face and each one of the optical faces of the exit face are aligned at a same position of the first axis,
    wherein a virtual plane extends from an end of the one optical face of the incidence face in the first axis to an end of the one optical face of the exit face in the first axis,
    wherein among light flux emitted from a spot light source and entering the one optical face of the incidence face, a light beam that passes over the virtual plane is reflected at the prism face, and passes over the virtual plane again and goes to the one optical face of the exit face, and
    wherein the second pitch is smaller than both the first pitch and the third pitch.

2. The imaging system of claim 1, wherein light flux emitted from the spot light source enters the plurality of optical faces of the incidence face, exits from the plurality of optical faces of the exit face, and then focuses at substantially a single point.

3. The imaging system of claim 1, wherein the first pitch and the third pitch are equal.

4. The imaging system of claim 1, wherein the second pitch is one-half or less of the first pitch and twenty times or more a wavelength of incident light.

5. The imaging system of claim 1, further comprising one of a diffusing face to diffuse incident light and an absorbing face to absorb incident light,
    wherein the diffusing face or the absorbing face is disposed boundaries of adjacent two optical faces of the incidence face or boundaries of adjacent two optical faces of the exit face,
    wherein the optical faces are convex with respect to the diffusing face or the absorbing face.

6. The imaging system of claim 5, wherein the diffusing face or the absorbing face has a curved shape in cross-section perpendicular to the first axis.

7. The imaging system of claim 5, wherein, with respect to a second axis perpendicular to both of the first axis and an optical axis of the optical face, the diffusing face or the absorbing face in the first axis has a size that is narrowest at the center of the optical face and widens toward the edges of the optical face.

8. The imaging system of claim 7, wherein a minimum size of the diffusing face or the absorbing face in the first axis is from one-half to two times the second pitch.

9. A print head comprising:
    the imaging system of claim 1; and
    a light source having a plurality of light emitting elements arranged along the first axis of the imaging system.

10. An image forming apparatus comprising:
    an image carrying member;
    the print head of claim 9 that forms a latent image on the image carrying member; and
    a development unit to develop the latent image.

11. An image scanner comprising:
    the imaging system of claim 1; and
    a receiving device having a plurality of receiving elements, arranged along the first axis of the imaging system, to receive light via the imaging system.

* * * * *